Patented June 14, 1949

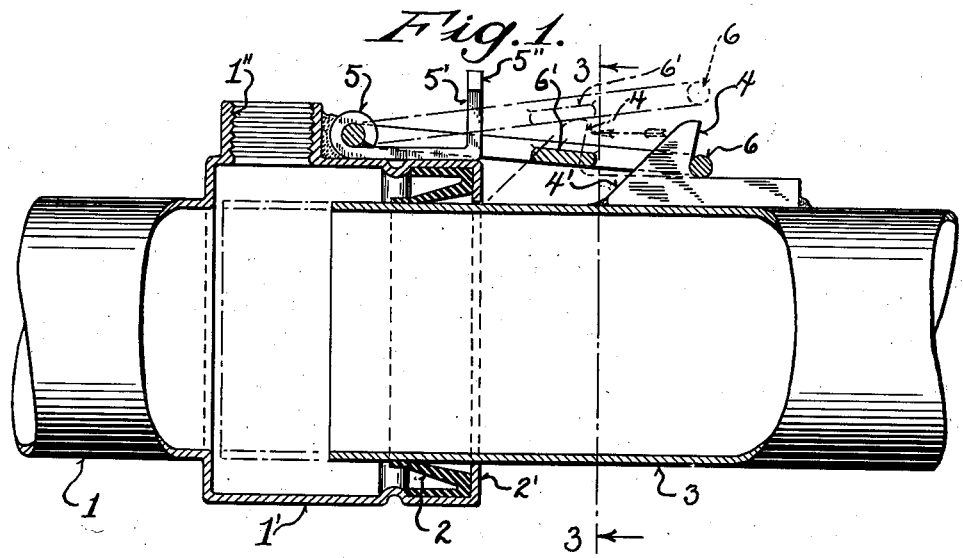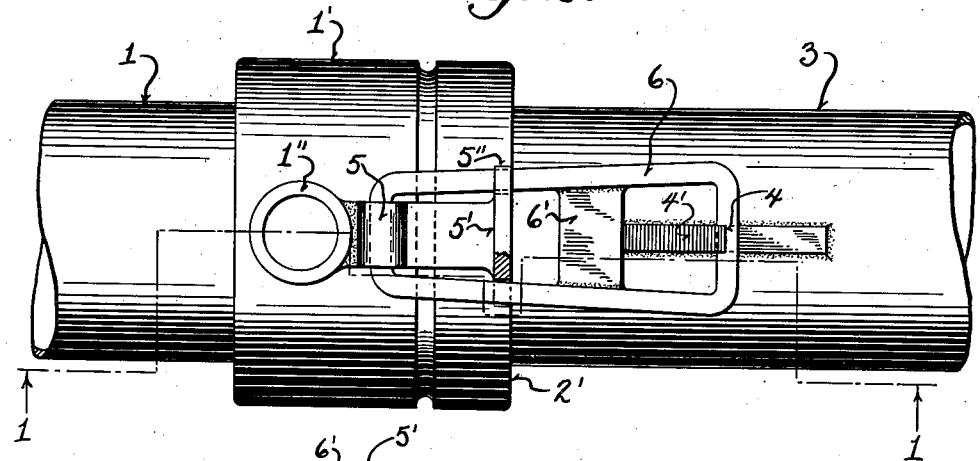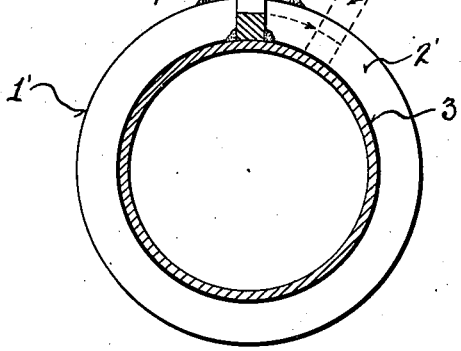

2,473,283

UNITED STATES PATENT OFFICE 2,473,283

COUPLING PIPE

Harvey O. Guenthner, Antigo, Wis.

Application March 24, 1947, Serial No. 736,815

1 Claim. (Cl. 285—172)

My invention refers to pipe couplings and it has for its primary object to provide a coupling particularly adapted for use in irrigation systems, wherein the pipe lines are shifted from place to place and a great saving in labor is effected by simply manipulating each pipe section to couple or uncouple the same.

The specific object of my invention is to provide a tapered nose coupling tooth on a male pipe end, associated with a webbed link pivoted on a female pipe end, whereby upon telescopic union of said pipe ends they are automatically locked together and by a further telescopic movement of the male pipe member in the same direction they are uncoupled.

Hence, to complete the uncoupling operation, it will be noted that the nose will engage the link web and the male pipe member will then be given a slight rotation, whereby the nose will ride upon the web, clear of the link, to free said nose therefrom to permit withdrawal of the male pipe member.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings,

Figure 1 represents a sectional elevation of a pipe coupling embodying the features of my invention, the section being indicated by line 1—1 of Figure 2.

Figure 2 is a plan view of the same, and

Figure 3 a cross section through the pipe coupling, the section being indicated by line 3—3 of Figure 1.

Referring by characters to the drawings, 1 represents a pipe having an open ended coupling head 1' extending therefrom, the same being provided with an irrigation nipple 1".

This coupling head is of standard type and it carries a flexible hat-packing 2 nested within the flanged end 2' of said head. Slidably fitted into the head is a pipe end 3, the mouth of which extends beyond the hat-packing, whereby a tight joint is effected.

Secured a predetermined distance from the mouth of the male pipe end is a coupling tooth 4 having an inclined nose 4' extending toward the coupling head 1'.

The coupling head has suitably secured thereto a bracket having a looped end 5, and a vertically disposed guide strip 5'.

Pivotally mounted in the bracket loop 5 is a coupling link 6 terminating with a lock stretch, which link, rearwardly of the lock stretch 6, carries a transversely disposed cam web 6' spaced from the end of said link.

From the foregoing description it will be apparent, when the coupling connection is effected the link engages the tooth 4, as shown in Figure 1 of the drawings whereby the pipe sections are securely locked together.

It frequently happens that it is desirable to shift the position of the pipe line in irrigating fields. Hence when it is desired to shift said pipe members by uncoupling the same, all that is necessary is for the operator to slide the male member 3 inwardly as indicated in dotted lines, Figure 1. In effecting this movement the tapered nose 4 of the coupling tooth will engage the cam web 6' of the link whereby said link is raised and disconnected from the tooth.

It will be noted when the above movement is effected that the inward movement of the tooth is limited by its engagement with the flange 2' of the head. Hence all that is now required to uncouple the pipe members is to oscillate the male member slightly, as best shown in dotted lines, Figure 3, whereby the tooth rides on the cam web and is shifted beyond the confines of the link and in this position the male pipe member may be withdrawn from its female connection by a single operation which eliminates the necessity of manual movement of the link for uncoupling purposes. Hence a great saving in time is effected for dismantling the pipe system when required.

It should also be noted that the strip 5' terminates with stop lugs 5" whereby swinging movement of the link is limited and said link is thus guided in all directions.

I claim:

A coupling comprising male and female pipe sections adapted to be in telescopic union, the female pipe section having an enlarged head provided with a down turned flange engaging the male pipe section, a link pivoted to the pipe head, the same terminating with a transversely disposed releasing cam web carried by the link rearwardly of its locking stretch and adjacent the pipe head flange, a tapered nose tooth carried by the male pipe section and projecting through the link between its cam web and locking stretch, when the pipe sections are coupled together, the pipe sections being uncoupled by a further inward movement of the male pipe section, whereby the inclined pipe face of the tooth engages the cam web to lift the link from its locking engagement with the tooth, the inner locking movement of said tooth being limited by its engagement with the head flange and thereafter the coupling connection of the pipe sections is freed by a partial relevant rotation of one of said pipe sections, whereby the tooth nose rides transversely upon the link cam web to clear it from said link prior to withdrawing the pipe members from each other.

HARVEY O. GUENTHNER.

REFERENCES CITED

The following references are of record in the file of this patent:

UNITED STATES PATENTS

| Number | Name | Date |
|---|---|---|
| 341,713 | Young | May 11, 1886 |
| 2,251,651 | Ames et al. | Aug. 5, 1941 |